J. Curtis.
Harvester Rake.
Nº 45228 — Patented Nov. 29, 1864.
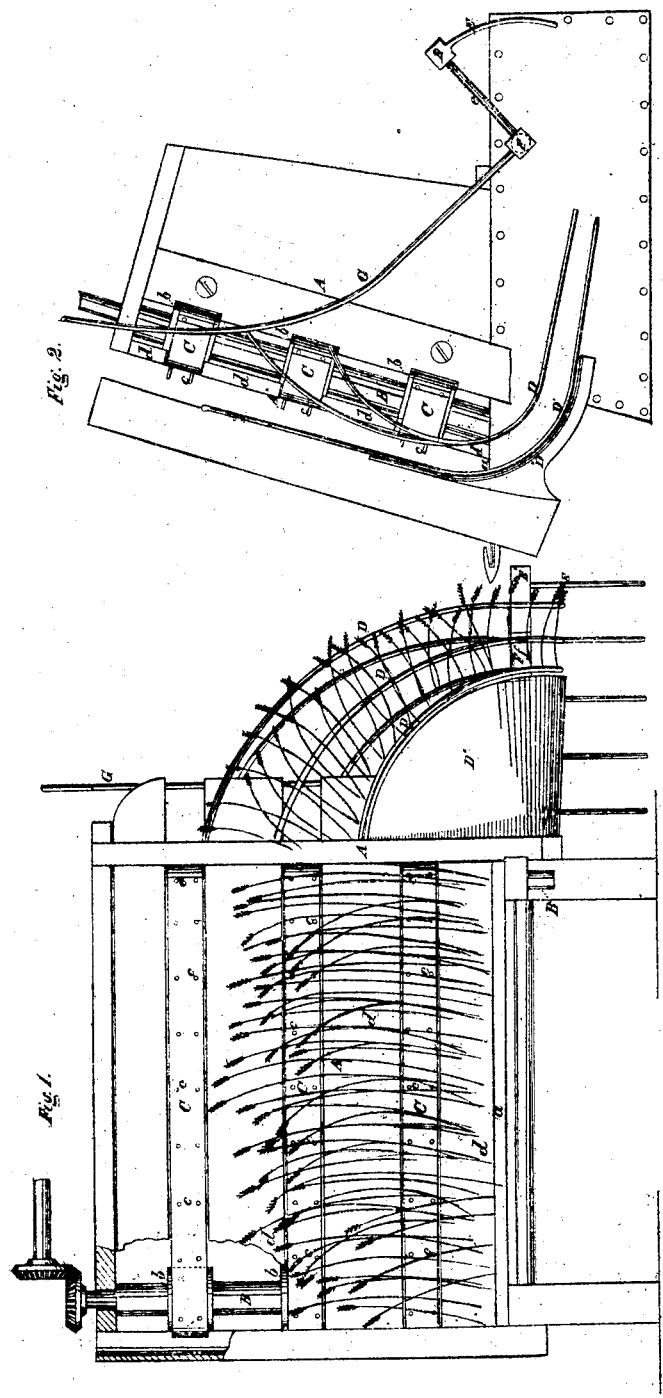
Witnesses.
Inventor

UNITED STATES PATENT OFFICE.

JOHN CURTIS, OF HACKETTSTOWN, NEW JERSEY.

IMPROVEMENT IN HARVESTERS.

Specification forming part of Letters Patent No. 45,228, dated November 29, 1864; antedated November 21, 1864.

*To all whom it may concern:*

Be it known that I, JOHN CURTIS, of Hackettstown, in the county of Warren and State of New Jersey, have invented a new and Improved Delivery for Reapers; and I do hereby declare that the following is a full, clear, and exact description of the same, reference being had to the accompanying drawings, forming a part of this specification, in which—

Figure 1 represents a sectional front elevation of my invention. Fig. 2 is a side elevation of the same.

Similar letters of reference in both views indicate corresponding parts.

This invention consists in the application to the platform of a reaper of a reclining-frame furnished with two or more endless carrying-bands stretched over suitable rollers or pulleys, in combination with curved guide-bars and with an adjustable rake in such a manner that the grain, on being cut, is delivered in an upright or slightly-reclining position to the carrying-bands, and thence passed onto the curved guide-bars, which deposit the same in a swath on the ground in a position parallel with the rake-head, or transversely to the direction in which the machine moves, and that by the action of the rake the grain can be readily gathered in heaps or bundles suitable for sheaves.

To enable those skilled in the art to make and use my invention, I will proceed to describe it.

A represents a frame, made of wood or any other suitable material, and intended to be placed on the platform of a reaper close behind the cutter-bar, so that the grain, on being cut, is passed directly from the cutters on the receiving-plate or secondary platform *a* of the frame A. This frame is slightly reclining, as clearly shown in Fig. 2 of the drawings, and it is provided with two shafts, B B', which have their bearings in the top and bottom plates of the frame A. Each of these shafts carries two or more pulleys, *b b'*, which are firmly connected to them, and over which the endless carrying-bands C are stretched. These bands are made of leather or other suitable material, and they are furnished with teeth *c*, inserted into them at certain intervals, so that straw or other similar material thrown against them is carried along and deposited over the side of the frame A. The spaces between the carrying-bands C are filled out by slats *d*, the surfaces of which are level with the upper surfaces of the bands or belts, and thus a slightly-reclining platform, A*, is formed, from the surface of which the teeth *c* project, as clearly shown in Fig. 2 of the drawings.

The shaft B receives a rotary motion by means of a suitable bevel-gear, or in any other desirable manner, from the driving-gear of the reaper, and the carrying-bands transmit this motion from the shaft B to the shaft B'.

As the machine is drawn through a field and the grain is cut by the action of the cutters, it (the grain) is deposited in a slightly-reclining position on the platform A*, and by the action of the carrying-bands it is made to pass toward that end of the frame A which is armed with a series of curved guide-bars, D, and apron D*. By the action of these guide-bars and apron the grain is turned down to a horizontal position, as indicated in red outlines in Fig. 1, and deposited on the ground in regular swaths, each single grain or stalk being placed in a position transversely to the direction in which the machine moves, and parallel to the head E* of the rake E, which is situated behind the guide-bars D. This rake is supported by two or more arms, *e*, which extend from the oscillating shaft F, that has its bearings in the lower part of the frame A. A lever, G, which extends from the shaft F, and which can be operated from the driver's seat either by hand or by foot, serves to turn said shaft F and to raise the rake from the ground.

If it is desired to deposit the grain in swaths on the ground, the rake is raised, and the grain, on leaving the curved guide-bars, places itself on the ground, as previously described; but if it is desired to collect the grain in sheaves the rake is lowered to the ground, and whenever a sufficient quantity of grain for one sheaf has collected in it it is suddenly raised and the grain discharged. This delivery can be attached to any reaper, new or old, and can be operated with the greatest ease, enabling the driver to deposit the grain on the ground either in swaths or in sheaves, as he may desire.

What I claim as new, and desire to secure by Letters Patent, is—

The reclining platform A*, with endless carrying-bands C, in combination with the curved guide-bars D and hinged rake E, constructed and operating in the manner and for the purpose substantially as herein shown and described.

JOHN CURTIS.

Witnesses:
 HENRY H. VANATTA,
 DAVID SHIELDS.